March 8, 1932.  L. NYCZ  1,848,967
SPRING AUTOMOBILE TIRE
Filed Aug. 2, 1928
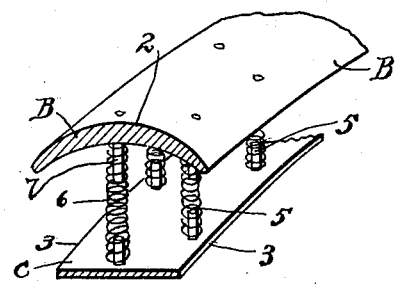
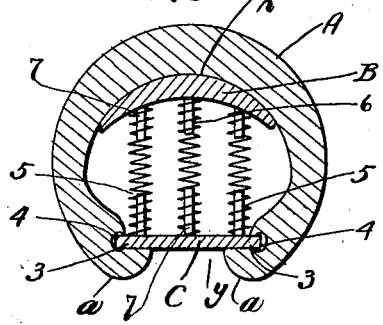
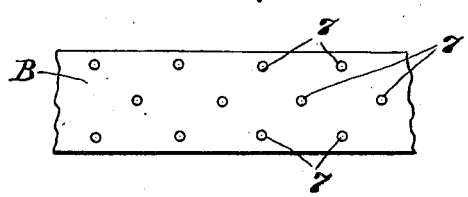
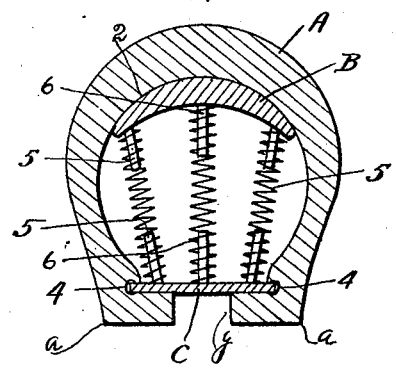
INVENTOR
Louis Nycz
BY
F. N. Gilbert
ATTORNEY Patented Mar. 8, 1932

1,848,967

UNITED STATES PATENT OFFICE

LOUIS NYCZ, OF BINGHAMTON, NEW YORK

SPRING AUTOMOBILE TIRE

Application filed August 2, 1928. Serial No. 296,903.

My invention pertains to spring automobile tires in which the resilience of the tire is produced by the presence of a spring tire frame mounted within the wheel tire, and it has for its object to provide for an automobile tire, having in place of a pneumatic tube a resilient metal interior support.

With these objects in view my invention consists of certain novel features of construction and arrangement of parts as will be more clearly hereinafter described and pointed out in the claims, reference being had to the accompanying drawings, in which:—

Fig. 1 is a perspective view of a fragmentary part of the spring tire frame of my device.

Fig. 2 is an end view in cross section of my device.

Fig. 3 is a plan view of a fragmentary part of the outer spring band of my device.

Fig. 4 is an end view in cross section of a modified form of my device.

The same reference characters denote like parts in each of the several figures of the drawings.

In carrying out my invention, I have the usual tire body A, within the tire body A I have an interior spring rim which is composed of an outer and inner metal rim band, the outer band designated by B, and the inner rim band designated by C, the outer rim band B is slightly curved in its outer side at 2, to closely fit, and to conform to the inner side of the tire body A, while the inner rim band designated by C is formed of a flat band having its side edges 3 shaped to conform to the interior of the tire A and adapted to be seated in recess 4 on either side of the base of the tire, preferably in the base flanges.

As a further part of my device I have between the inner rim band C and the outer rim band B, three rows of radially positioned coil springs, one row of coil springs on each side indicated by 5.5 and 5.5, and a center row by the numerals 6.6. These springs are alternately placed so that the center spring 6 is at an opposite position equally distant between the side springs 5.5. Mounted in the under surface of the rim B, in any convenient manner, I have the radial pins 7 which extend and project within the coil springs 5.5 and 6.6, surrounded by the springs, and in which the pins act as plungers in slidable movement with the radial springs mentioned, and also as guides for holding the springs 5.5 and 6.6 in radial position. In the outer surface of rim C I have also the radial pins 7.7 which project into the inner ends of the coil springs 5.5 and 6.6 and act as guides and plungers at the inner ends of the springs mentioned, to stay the sidewise distortion of the springs. In the formation and mounting of my structure, I spring apart and open the mouth Y of tire body A and insert therein the body of my spring structure between the sides $a$ and $a$ of the tire body A until the outer rim band B is in place and positioned against the under side of the tread of the tire body A as shown in Figs. 2 and 4. I then crowd into place the edges 3.3 of the flange C into the recesses 4.4 of the tire body A and the spring structure is then in position within the tire body A, for use.

Figure 4 is a modified form of my invention in which the outer rows of pins 7 in the outer band converge so as to be in alignment or registration with the outer row of pins on the inner band which are divergent.

Having thus described my invention, what I claim as new and for which I desire Letters Patent is as follows:

1. In a spring tire, a tire body provided at its base with annular opposing recesses, an annular inner flat spring band disposed in the tire with its side edges seated in the opposing recesses, an outer spring band arcuate in cross section disposed within the tire and engaging the inner surface of the tread portion and supported thereby, staggered rows of coil springs engaging the inner and outer bands and pins projecting from the inner and outer bands and disposed within each end of the coil springs.

2. In a spring tire, a tire body having base flanges provided with opposing circumferential recesses, an annular inner flat spring band disposed within the tire with its side edges seated in said opposing recesses and supported therein, an outer band arcuate in cross section engaging the under surface of the tread portion of the tire body, projecting pins disposed along the opposing surfaces of the inner and outer bands, said pins being disposed in staggered relation, and coil springs located between the inner and outer bands with their ends disposed about opposing projecting pins.

3. In a spring tire, a tire body, an annular inner flat spring band disposed in the tire at the base thereof and supported thereby, an outer spring band arcuate in cross section disposed within the tire beneath the tread surface thereof, staggered rows of pins projecting from the inner band, the pins of the outer rows diverging, staggered rows of pins projecting inwardly from the arcuate outer band said pins being in alignment with the pins on the inner band with the outer rows of pins converging, and coil springs encircling the pins and separating the inner and outer bands.

In testimony whereof I have affixed my signature.

LOUIS NYCZ.